United States Patent Office 2,697,026
Patented Dec. 14, 1954

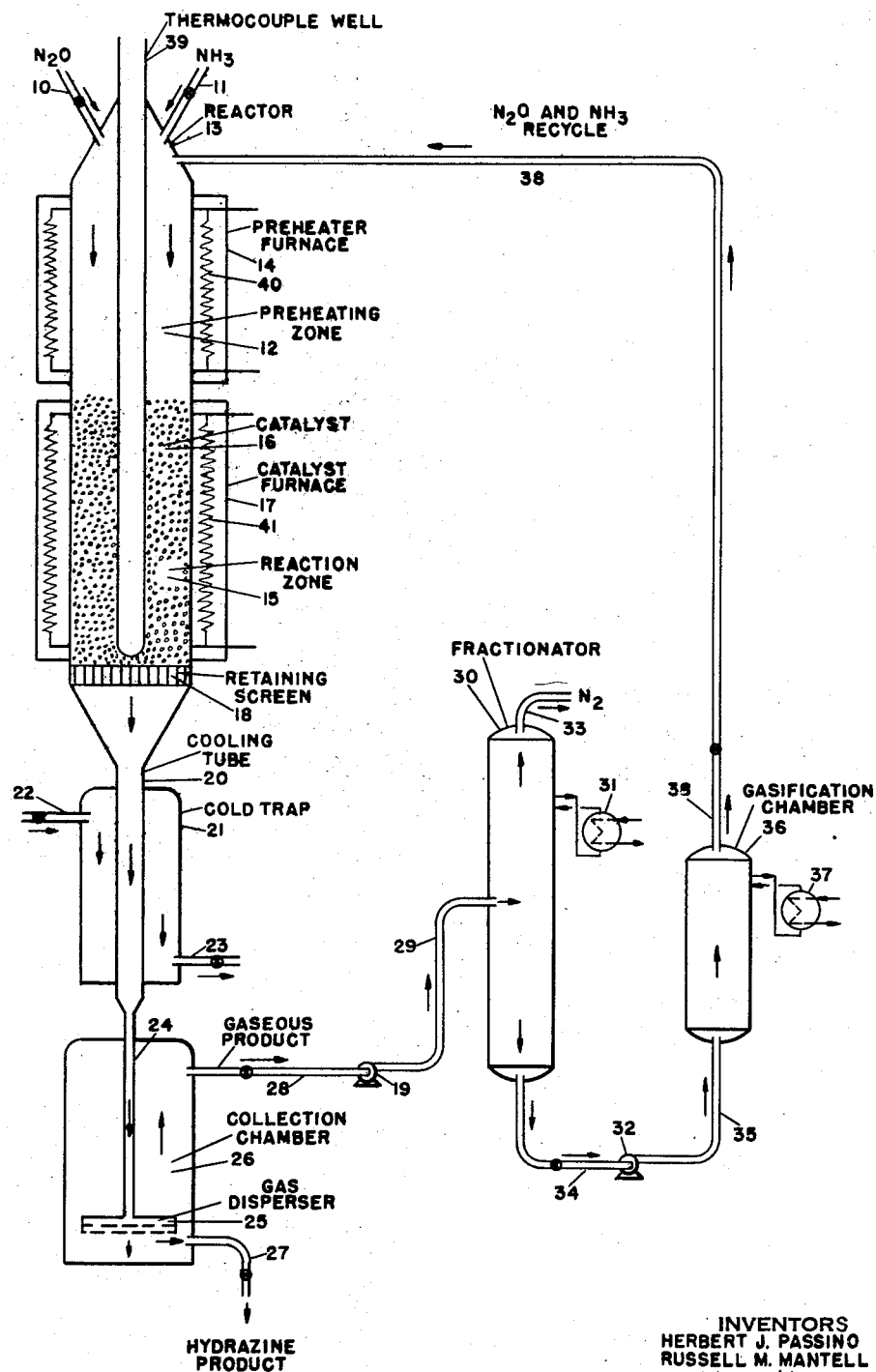

2,697,026

MANUFACTURE OF HYDRAZINE

Russell M. Mantell, Newark, and Herbert J. Passino, Englewood, N. J., assignors to The M. W. Kellogg Company, Jersey City, N. J., a corporation of Delaware Application February 21, 1951, Serial No. 212,138

13 Claims. (Cl. 23—190)

This invention relates to a process for the manufacture of hydrazine from nitrous oxide. More particularly, the invention relates to a process for the manufacture of hydrazine by the vapor phase catalytic reduction of nitrous oxide. One of the objects of the invention is to provide an improved process for the manufacture of hydrazine in which the synthesis reaction can be controlled without difficulty and without loss of formed hydrazine as a result of decomposition. Another object of the invention is to provide an improved process for the manufacture of hydrazine from readily available materials. Other objects and advantages inherent in the invention will become apparent from the following description.

According to this invention, the manufacture of hydrazine is accomplished, generally, under the conditions more fully hereinafter disclosed, by reacting in the vapor phase nitrous oxide with ammonia and/or hydrogen in the presence of a hydrogenation catalyst to produce a reaction product in the vapor state comprising hydrazine, water, unreacted nitrous oxide and unreacted ammonia and/or hydrogen. The resulting reaction product is next treated, under the conditions more fully hereinafter disclosed, to recover hydrazine from this product, either in the form of hydrazine hydrate or as hydrazine salts. The remaining unreacted reactants may then be recycled to the initial reaction zone for reuse. Recovered hydrazine hydrate, or hydrazine salts are thus obtained as a product of the process, or if so desired may be subjected to further treatment, as hereinafter disclosed, to obtain pure hydrazine.

The reaction between nitrous oxide and either ammonia or hydrogen in the vapor phase, that is, with both reactants being present in a vapor state, may be represented as follows:

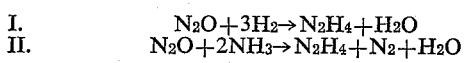

I.   $N_2O + 3H_2 \rightarrow N_2H_4 + H_2O$
II.  $N_2O + 2NH_3 \rightarrow N_2H_4 + N_2 + H_2O$ According to Equation I above, reaction between nitrous oxide and hydrogen produces a mixture of hydrazine and water, while from Equation II above, it will be noted that gaseous nitrogen is produced as an additional component of the resulting mixture. In each instance, nitrogen and any excess quantities of nitrous oxide, ammonia and hydrogen in the product of reaction are obtained in the vapor state. Hydrazine and water that are formed are obtained in the gaseous state when the reaction is carried out at relatively high temperatures, that is at temperatures above approximately the boiling point of hydrazine, or in the liquid state when the reaction is carried out at relatively low temperatures, that is at temperatures below approximately the boiling point of water, within the temperature conditions hereinafter described. The resulting reaction product, however, which comprises unreacted nitrous oxide, unreacted ammonia and/or hydrogen and possibly nitrogen, in addition to hydrazine and water, is invariably obtained in the vapor state as a reaction effluent, regardless of whether hydrazine and water, per se, are formed in either the liquid or gaseous state. This effluent is obtained in the vapor state by reason that unreacted gases, together with any formed nitrogen, act as a carrier for the formed hydrazine and water to produce a total reaction effluent in the vapor state.

In carrying out the reaction it is essential that the temperature be sufficiently high to cause the reaction to proceed at a satisfactory rate but should not reach the point at which appreciable thermal decomposition of the formed hydrazine product will take place. The reaction proceeds at a temperature of about 70° F., but a temperature of at least about 250° F. is necessary to cause the reaction to proceed at a practical rate. As the reaction temperature is raised above about 250° F., the activity of the catalyst employed in carrying out the reaction, as more fully hereinafter described, is increased so that at about 700° F. the optimum yield of hydrazine is obtained. Consequently, the preferred range of reaction temperatures is between about 250° F. and about 700° F. Temperatures above 700° F. may be used but the net production of hydrazine is decreased, as a result of partial hydrazine decomposition, so that as the temperature is raised to above approximately 900° F. there is a practical disappearance of hydrazine from the formed product of reaction. Therefore, the possible operating temperature range is between about 70° F. and about 900° F. In this respect, it should be noted that it may be desirable to preheat the reactant gases prior to their introduction into the reaction zone if so desired.

The reaction is preferably carried out at approximately atmospheric pressure, although pressures as low as 0.5 atmosphere and super-atmospheric pressure as high as about 100 atmospheres may also be successfully employed. While pressures in excess of 100 atmospheres may also be employed, from an economic standpoint the resulting gain in the ease of effecting reaction may not offset the increase in cost of construction materials and mechanical apparatus encountered by operating at such increased pressure.

As indicated in Equations I and II above, reaction in the vapor state between nitrous oxide and hydrogen takes place in the stoichiometric ratio of 1:3, while reaction between nitrous oxide and ammonia takes place in the stoichiometric ratio of 1:2. It is preferred, however, to have an excess of the vaporous hydrogen or ammonia reactants present over the stoichiometric requirements when carrying out the reaction, in order to maintain sufficient dilution of the formed hydrazine product and thereby avoid subsequent oxidation of hydrazine, inasmuch as hydrazine oxidizes more readily than either ammonia or hydrogen. Even though in some instances the reaction may be carried out within the lower limits of the broad temperature range, for example, between about 70° F. and about 250° F., such excess quantities of hydrogen and/or ammonia present over the stoichiometric requirements are not harmful, since these unreacted reactants are withdrawn with the formed hydrazine product and may subsequently be recycled to the initial reaction step. However, in commercial practice, the effect of the excess hydrogen or ammonia in greatly enlarging the reaction space needed, must be taken into account in the economics of the process. Therefore, in order to have such desired excess of the reducing agent present (that is, hydrogen and/or ammonia), it is preferred that hydrogen and/or ammonia be employed in amounts equal to approximately twice the stoichiometric requirements. Thus, when conducting the operation in accordance with Equation I, mol ratios of nitrous oxide to hydrogen between the stoichiometric requirements (1:3) and approximately 1:6 may be employed, with the higher mol ratio of about 1:6 being preferred. Likewise, when conducting the operation according to Equation II, mol ratios of nitrous oxide to ammonia between the stoichiometric requirements (1:2) and approximately 1:4 may be employed, with the higher mol ratio of about 1:4 being preferred.

As previously indicated, the vapor phase reaction of nitrous oxide with ammonia and/or hydrogen is conducted in the presence of a hydrogenation catalyst. This catalyst is preferably employed in a fixed-bed state, although the reaction may also be carried out with the catalyst in a fluid-bed state if so desired. The catalyst comprises either a hydrogenating metal or hydrogenating metal oxide. Suitable catalysts comprise such hydrogenating metals as silicon, chromium, and the metals of group VIII of the periodic table, with metals of the iron group of group VIII (namely, iron, cobalt and nickel) being preferred. In addition, catalysts comprising oxides of these hydrogenating metals may also be used. Such catalysts may comprise silica, chromium oxide, cobaltous oxide, cobaltic oxide, nickel oxide or ferric oxide. The foregoing catalysts may be employed either supported or unsupported. Suitable supports include clays, such as bentonite or diatomaceous earths; kieselguhr; silica or alumina, activated or unactivated; and synthetic supports such as silica gel or alumina gel. Of the aforementioned catalysts it has been found that the maximum yields of hydrazine are obtained with the iron group catalysts of group VIII, in accordance with the data hereinafter shown. These preferred catalysts comprise ferric oxide, cobaltic oxide on alumina and nickel on kieselguhr.

The contact time between the hydrazine-producing reactants and catalyst is preferably maintained for a period between about 0.1 second and about 1.0 second, although a contact time varying between about .01 second and about 10 seconds may also be maintained to effect the production of hydrazine. In accordance with the data hereinafter disclosed, it will be noted that when employing catalysts comprising the aforementioned iron group of group VIII, a contact time between about 0.3 second and about 0.8 second produces the maximum yields of hydrazine.

The following table represents data obtained by reacting nitrous oxide with either ammonia or hydrogen, employing some of the aforementioned catalysts under the conditions of temperature and contact time indicated. All of these reactions were carried out at approximately atmospheric pressure. The presence of hydrazine was identified in the product obtained from each of the runs, through the use of p-dimethylaminobenzaldehyde as a test reagent.

$32°$ F. may also be employed, to effect condensation of gaseous reactants in the aforementioned hydrazine reaction product. Following the aforementioned condensation treatment, the resulting product comprises hydrazine in the form of its hydrate (i. e., $N_2H_4 \cdot H_2O$) and also contains nitrogen and unreacted gaseous reactants, namely, nitrous oxide, ammonia and/or hydrogen. Hydrazine hydrate, being heavier than the other products thus formed, may be withdrawn from the condensation vessel, while the remaining gaseous products are withdrawn in order to prevent subsequent dilution of the reaction in the continuous process, and are subjected to purification treatment for reuse in the hydrazine-producing system.

In order to purify the remaining products of reaction, after the aforementioned removal of the hydrazine hydrate product from the condensation vessel, so that nitrous oxide together with ammonia and/or hydrogen reactants may be reused in the system, the hydrazine-free gaseous product of reaction is next withdrawn from this vessel and passed to a suitable low temperature fractionation zone. In this fractionation zone the gaseous products are compressed to a point at which nitrous oxide and ammonia are liquefied, while nitrogen and hydrogen (if present) are removed as overhead gases. Hydrogen may be separated from nitrogen by conventional means and thus recovered for reuse; while the liquefied nitrous oxide and ammonia thus separated, may be gasified and also returned to the system for reuse. If so desired, a portion of the vented gaseous products may be compressed, cooled to about $-70°$ F. and utilized as a refrigerant for carrying out the condensation of the aforementioned hydrazine reaction product in the condensation vessel.

Table

| Run No | 1 | 2 | 3 | 4 | 5 | 6 | 7 | 8 | 9 | 10 |
|---|---|---|---|---|---|---|---|---|---|---|
| Catalyst | (1) | (1) | (2) | (3) | (3) | (2) | (4) | (4) | (5) | (6) |
| ml. $H_2$/min. at $70°$ F | 1,416 | 0 | 1,416 | 1,416 | 0 | 2,832 | 1,416 | 0 | 1,416 | 0 |
| ml. $N_2O$/min. at $70°$ F | 150 | 300 | 250 | 250 | 250 | 0 | 250 | 250 | 250 | 250 |
| ml. $NH_3$/min. at $70°$ F | 0 | 3,000 | 0 | 0 | 3,000 | 0 | 0 | 3,000 | 0 | 3,000 |
| Space Velocity at $70°$ F.[7] | 4,700 | 9,900 | 5,000 | 5,000 | 9,750 | 9,246 | 5,000 | 9,750 | 5,000 | 9,750 |
| Time (sec.) at $70°$ F.[8] | 0.77 | 0.36 | 0.72 | 0.72 | 0.37 | 0.39 | 0.72 | 0.37 | 0.72 | 0.37 |
| Temperature Range, $°$ F | 200-800 | 200-900 | 200-700 | 200-900 | 200-800 | 650-900 | 450-900 | 70-900 | 70-900 | 200-710 |
| Hydrazine Yield | slight | slight | slight | slight | moderate | moderate | moderate | high | high | high |

[1] Silica gel.
[2] 5 percent platinized asbestos.
[3] $Cr_2O_3$ on $Al_2O_3$ (7 percent chromia) cylindrical pellets 3/16 in. x 3/16 in. Reduced with $H_2$.
[4] $Co_2O_3$ (57 percent) on $Al_2O_3$. Reduced with $H_2$.
[5] Iron oxide pellets 3/16 in. x 3/16 in. Reduced with $H_2$.
[6] Nickel on kieselguhr.

[7] Defined as: $\dfrac{\text{Total volume of gas/hr. at } 70° \text{ F.}}{\text{Apparent volume of catalyst at } 70° \text{ F.}}$

[8] Defined as: $\dfrac{\text{Apparent volume of catalyst at } 70° \text{ F.}}{\text{Total volume of gas/sec. at } 70° \text{ F.}}$ In runs 1 through 4 the quantity of hydrazine produced was slight with no exothermic reaction. In run 5 moderate quantities of hydrazine were detected accompanied by highly exothermic reaction. In run 6 moderate quantities of hydrazine began to form at about $650°$ F. and increased with increase in temperature, accompanied by exothermic reaction and water formation. In run 7 moderate quantities of hydrazine began to form at about $450°$ F. accompanied by exothermic reaction and water formation. In run 8 the amount of hydrazine produced was high and was formed over the entire temperature range accompanied by exothermic reaction and water formation. In run 9 the amount of hydrazine produced was high and was formed over the entire temperature range, but with increased yields at the higher temperatures accompanied by exothermic reaction and water formation. In run 10 the amount of hydrazine produced was high and the formation of hydrazine was observed to begin at about $200°$ F. and continued to the end of the run, accompanied by exothermic reaction and water formation.

As previously indicated, the resulting product is obtained in the vapor state and comprises hydrazine, water, unreacted nitrous oxide and unreacted ammonia and/or hydrogen, and may also contain nitrogen as an additional component when ammonia is employed as a reducing agent. This reaction product is preferably passed through a cold trap, comprising a chamber or vessel surrounded by a suitable refrigerant, for example, solid carbon dioxide, or a mixture of carbon dioxide and acetone, preferably maintained at a temperature of at least about $-70°$ F., although temperatures not higher than about Instead of purifying the vaporized hydrazine reaction product through the use of the aforementioned cold trap, purification may also be obtained through the use of a water-bath. Such treatment comprises passing the vaporized reaction product into a vessel containing water, and maintained at about $32°$ F., to obtain a dilute aqueous solution of hydrazine hydrate and unreacted gaseous components of the reaction product. These gaseous components may be withdrawn and further treated, as indicated above, for the recovery and reuse of the gaseous nitrous oxide and ammonia or hydrogen reactants.

Another method for purifying the vaporized hydrazine reaction product may be effected through the use of an acid-bath. This treatment comprises bubbling the gaseous reaction product through a dilute aqueous solution of an inorganic acid, such as hydrochloric acid or sulfuric acid, having an acid:water ratio of about 1:1, to produce the corresponding hydrazine salt, e. g., hydrazine hydrochloride or hydrazine sulfate. The salts can be crystallized from the remaining aqueous solution, or removed by partial evaporation and subsequent crystallization, as a product of the process. The remaining gaseous components of the reaction product can then be separated and treated, as previously indicated, for subsequent reuse in the system.

For a fuller understanding of the process of the invention, reference is had to the accompanying drawing which illustrates, diagrammatically, an elevational view of one form of the apparatus employed and capable of carrying out an embodiment of the process of the invention. It should be noted, however, that it is not intended that the invention be limited to the embodiment as illustrated, but is capable of other embodiments which may extend beyond the scope of the apparatus shown. Some of the mechanical elements necessary to effect the transfer of liquids and vapors and to maintain the conditions of temperature and pressure necessary to carry out the function of the apparatus, have been omitted in order to simplify the description.

Referring to the drawing, gaseous nitrous oxide and ammonia are introduced under pressurized flow through valved-lines 10 and 11, respectively, into a preheating zone 12 in a reactor 13. The flow of these recycle gases into reactor 13 is so regulated that the quantities present are in accordance with the aforementioned mol ratio requirements. In preheating zone 12 these gases are preheated to the desired temperature within the aforementioned temperature ranges, by suitable heating means represented by preheater furnace 14. The resulting mixture of preheated nitrous oxide and ammonia are then passed from preheating zone 12 into reaction zone 15. Reactor 13 is shown in a vertical position in the drawing, but may also be in a horizontal position if desired. This reactor is a cylindrical steel vessel approximately three feet in length, 2 inches in diameter and has a wall thickness of about ¼ inch. In reaction zone 15 the downflowing mixture of preheated reactant gases comes into contact with one of the aforementioned hydrogenation catalysts 16, which is in a fixed-bed state. In reaction zone 15 catalytic reaction between the nitrous oxide and ammonia reactants takes place, with the desired temperature being maintained within this reaction zone through the use of suitable heating means represented by catalyst furnace 17. Preheater furnace 14 and catalyst furnace 17 are provided with suitable electrical heating elements 40 and 41, respectively, in order to maintain the desired temperature conditions within the reactor. The catalyst bed in reaction zone 15 is supported by means of a retaining screen 18 positioned across the lower opening of the reactor. This retaining screen may be any suitable foraminous membrane comprising such materials as nickel, nickel alloys, copper or brass. The required pressure conditions in reaction zone 15, within the aforementioned pressure ranges, are maintained by means of pump 19. Reactor 13 is also provided with a thermocouple well 39 in order to allow the taking of readings of temperature conditions maintained within the reactor.

As a result of the vapor phase contact reaction between nitrous oxide and ammonia in reaction zone 15, there is obtained a reaction product comprising hydrazine, water, nitrogen and some excess or unreacted quantities of nitrous oxide and ammonia. This reaction product passes from reaction zone 15 through retaining screen 18 into a condensing tube 20 which is attached to the lower portion of reactor 13. Cooling tube 20 is positioned within a suitable cooling means, represented by cold trap 21. Cold trap 21 is supplied with a suitable circulating refrigerant, such as a mixture of carbon dioxide and acetone maintained at the aforementioned temperature of about —70° F., which is introduced through valved-line 22 and emerges through valved-line 23. Following the above-mentioned condensation treatment in cold trap 21, the resulting product comprising hydrazine in the form of its hydrate ($N_2H_4 \cdot H_2O$), nitrogen and unreacted nitrous oxide and ammonia, passes from cooling tube 20 into withdrawal tube 24 which is attached to a fritted gas dispenser 25. Tube 24 and gas dispenser 25 are positioned within a suitable collection or storage vessel represented by collection chamber 26. Hydrazine hydrate, being heavier than the other gaseous products of reaction, passes through gas dispenser 25 and is withdrawn through valved-line 27 as a product of the process. The remaining gaseous mixture of nitrogen, nitrous oxide and ammonia, being lighter than hydrazine hydrate, passes upwardly through collection chamber 26 and is removed through valved-line 28 by means of the pumping action of pump 19.

The gaseous mixture of nitrogen, nitrous oxide and ammonia is next transferred through line 29, to a suitable fractionation zone, represented by fractionator 30. In this fractionation vessel, the gaseous mixture is heated by suitable heating means, represented by heat exchanger 31, and compressed by means of the pumping action of pump 32, so that gaseous nitrogen is recovered overhead through line 33. The remaining nitrous oxide and ammonia are liquefied in this fractionation zone and are withdrawn through valved-line 34. This liquefied mixture of nitrous oxide and ammonia is next transferred by means of pumping action of pump 32 from line 34, through line 35 into a gasification chamber 36. In gasification chamber 36, the liquid mixture of nitrous oxide and ammonia is heated to the gaseous or vapor state by suitable heating means represented by heat exchanger 37. Following gasification in chamber 36, a gaseous mixture of nitrous oxide and ammonia is withdrawn through valved-line 38 and transferred through this line into preheating zone 12 in reactor 13, for further reuse in the process. It should be noted that while the reactants employed in conjunction with the presently illustrated apparatus are gaseous nitrous oxide and gaseous ammonia, the same apparatus may also be employed to produce hydrazine from gaseous nitrous oxide and gaseous hydrogen or gaseous nitrous oxide and a mixture of gaseous ammonia and gaseous hydrogen.

We claim:

1. A process for the manufacture of hydrazine which comprises: reacting in the vapor phase nitrous oxide and a reactant material selected from the group consisting of ammonia, hydrogen and mixtures thereof, in the presence of a catalyst comprising at least one metal selected from the group consisting of silicon, chromium and the metals of group VIII of the periodic table, in a mol ratio of nitrous oxide to the total of said reactant material of at least 1:2 and not higher than about 1:6, said reaction being effected at a temperature between about 70° F. and not higher than 900° F. and at a pressure between about 0.5 atmosphere and about 100 atmospheres, to form a product comprising hydrazine; and separating hydrazine from said product.

2. A process for the manufacture of hydrazine which comprises: reacting in the vapor phase nitrous oxide and a reactant material selected from the group consisting of ammonia, hydrogen and mixtures thereof, in the presence of a catalyst comprising at least one metal selected from the group consisting of silicon, chromium and the metals of group VIII of the periodic table, in a mol ratio of nitrous oxide to the total of said reactant material of at least 1:2 and not higher than about 1:6, said reaction being effected at a temperature between about 70° F. and not higher than 900° F. and at a pressure between about 0.5 atmosphere and about 100 atmospheres and said catalyst being maintained in contact with said reactants for a period between about .01 and about 10 seconds, to form a product comprising hydrazine; and separating hydrazine from said product.

3. A process for the manufacture of hydrazine which comprises: reacting in the vapor phase nitrous oxide and a reactant material selected from the group consisting of ammonia, hydrogen and mixtures thereof, in the presence of a catalyst comprising at least one metal selected from the group consisting of silicon, chromium and the metals of group VIII of the periodic table, in a mol ratio of nitrous oxide to the total of said reactant material of at least 1:2 and not higher than about 1:6, said reaction being effected at a temperature between about 70° F. and not higher than 900° F. and at a pressure between about 0.5 atmosphere and about 100 atmospheres and said catalyst being maintained in contact with said reactants for a period between about 0.1 and about 1.0 second, to form a product comprising hydrazine; cooling said product to a temperature below about 32° F.; and separating hydrazine from said product.

4. A process for the manufacture of hydrazine which comprises: reacting in the vapor phase nitrous oxide and ammonia, in the presence of a catalyst comprising at least one metal selected from the group consisting of silicon, chromium and the metals of group VIII of the periodic table, in a mol ratio of nitrous oxide to ammonia of at least 1:2 and not higher than about 1:4, said reaction being effected at a temperature between about 250° F. and about 700° F. and at a pressure between about 0.5 atmosphere and about 100 atmospheres, to form a product comprising hydrazine; and separating hydrazine from said product.

5. A process for the manufacture of hydrazine which comprises: reacting in the vapor phase nitrous oxide and hydrogen, in the presence of a catalyst comprising at least one metal selected from the group consisting of silicon, chromium and the metals of group VIII of the periodic table, in a mol ratio of nitrous oxide to hydrogen of about 1:3 and not higher than about 1:6, said reaction being effected at a temperature between about 250° F. and about 700° F. and at a pressure between about 0.5 atmosphere and about 100 atmospheres, to form a product comprising hydrazine; and separating hydrazine from said product.

6. A process for the manufacture of hydrazine which comprises: reacting in the vapor phase nitrous oxide and a reactant material selected from the group consisting of ammonia, hydrogen and mixtures thereof, in the presence of a catalyst comprising at least one metal selected from the group consisting of silicon, chromium and the metals of group VIII of the periodic table, in a mol ratio of nitrous oxide to the total of said reactant material of at least 1:2 and not higher than about 1:6, said reaction being effected at a temperature between about 70° F. and not higher than 900° F. and at a pressure between about 0.5 atmosphere and about 100 atmospheres, to form a product comprising hydrazine hydrate and unreacted reactants; separating unreacted reactants from the remainder of said last-mentioned product; and recycling said unreacted reactants to said first-mentioned reaction step.

7. A process for the manufacture of hydrazine which comprises: reacting in the vapor phase nitrous oxide and ammonia, in the presence of a catalyst comprising at least one metal selected from the group consisting of silicon, chromium and the metals of group VIII of the periodic table, in a mol ratio of nitrous oxide to ammonia of at least 1:2 and not higher than about 1:4, said reaction being effected at a temperature between about 250° F. and not higher than 700° F. and at a pressure between about 0.5 atmosphere and about 100 atmospheres, to form a product comprising hydrazine; cooling said product to a temperature below about 32° F. to form a product comprising hydrazine hydrate and unreacted reactants; separating unreacted reactants from the remainder of said last-mentioned product; and recycling said unreacted reactants to said first-mentioned step.

8. A process for the manufacture of hydrazine which comprises: reacting in the vapor phase nitrous oxide and hydrogen, in the presence of a catalyst comprising at least one metal selected from the group consisting of silicon, chromium and the metals of group VIII of the periodic table, in a mol ratio of nitrous oxide to hydrogen of about 1:3 and not higher than about 1:6, said reaction being effected at a temperature between about 250° F. and not higher than 700° F. and at a pressure between about 0.5 atmosphere and about 100 atmospheres, to form a product comprising hydrazine; cooling said product to a temperature below about 32° F. to form a product comprising hydrazine hydrate and unreacted reactants; separating unreacted reactants from the remainder of said last-mentioned product; and recycling said unreacted reactants to said first-mentioned reaction step.

9. The process of claim 1 wherein said catalyst comprises a metal of group VIII of the periodic table.

10. The process of claim 1 wherein said catalyst comprises cobaltic oxide.

11. The process of claim 1 wherein said catalyst comprises ferric oxide.

12. The process of claim 1 wherein said catalyst comprises nickel supported on kieselguhr.

13. The process of claim 1 wherein said catalyst comprises chromium oxide.

References Cited in the file of this patent

"Chemistry of Hydrazine," by Audrieth and Mohr, page 3746, Chem. and Eng. News, vol. 26, No. 50; Dec. 13, 1948.

"A Comprehensive Treatise on Inorganic and Theoretical Chemistry," vol. 8, pages 210, 211, 311, 396, 397; Longmans, Green and Co., N. Y.